United States Patent
Sharma et al.

(10) Patent No.: US 9,456,370 B2
(45) Date of Patent: Sep. 27, 2016

(54) METHOD AND SYSTEM OF CELL SELECTION FOR A HANDOVER DURING COEXISTENCE OF LTE FDD/TDD NETWORKS

(71) Applicant: Samsung Electronics Co., Ltd., Suwon-si, Gyeonggi-do (KR)

(72) Inventors: Neha Sharma, Bangalore (IN); Ratnakar Rao Venkata Rayavarapu, Bangalore (IN); Fasil Abdul Latheef, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 14/516,954

(22) Filed: Oct. 17, 2014

(65) Prior Publication Data

US 2015/0109946 A1 Apr. 23, 2015

(30) Foreign Application Priority Data

Oct. 18, 2013 (IN) ............................ 4707/CHE/2013
Aug. 5, 2014 (IN) ............................ 4707/CHE/2013

(51) Int. Cl.
| | |
|---|---|
| H04W 80/04 | (2009.01) |
| H04W 24/08 | (2009.01) |
| H04L 5/14 | (2006.01) |
| H04W 36/00 | (2009.01) |
| H04W 76/02 | (2009.01) |
| H04W 88/06 | (2009.01) |

(52) U.S. Cl.
CPC ............... *H04W 24/08* (2013.01); *H04L 5/14* (2013.01); *H04W 36/0083* (2013.01); *H04W 76/027* (2013.01); *H04W 88/06* (2013.01)

(58) Field of Classification Search
CPC ... H04W 80/04; H04W 72/04; H04W 84/12; H04W 88/08; H04W 36/18; H04W 72/0446
See application file for complete search history.

(56) References Cited

U.S. PATENT DOCUMENTS

| | | | | |
|---|---|---|---|---|
| 6,249,681 | B1 * | 6/2001 | Virtanen | H04M 3/48 370/349 |
| 8,170,559 | B1 * | 5/2012 | Hsieh | H04J 11/0093 370/331 |
| 2005/0018656 | A1 * | 1/2005 | Rudolf | H04W 52/286 370/352 |
| 2007/0259668 | A1 * | 11/2007 | Legg | H04B 7/2656 455/450 |
| 2008/0232317 | A1 * | 9/2008 | Jen | H04W 74/002 370/329 |
| 2009/0161617 | A1 * | 6/2009 | Abedi | H04W 16/10 370/329 |
| 2010/0061326 | A1 * | 3/2010 | Lee | H04W 72/12 370/329 |
| 2011/0075604 | A1 * | 3/2011 | Fong | H04L 63/162 370/328 |
| 2014/0204909 | A1 * | 7/2014 | Cheng | H04W 8/082 370/331 |
| 2015/0092566 | A1 * | 4/2015 | Balachandran | H04W 8/22 370/242 |
| 2015/0271763 | A1 * | 9/2015 | Balachandran | H04W 52/245 370/338 |
| 2015/0341834 | A1 * | 11/2015 | Lee | H04W 36/0083 370/252 |

* cited by examiner

*Primary Examiner* — Chiho Lee
(74) *Attorney, Agent, or Firm* — Jefferson IP Law, LLP

(57) ABSTRACT

A method and system for performing a cell selection in case of a handover during co-existence of LTE TDD/FDD networks is provided. The method includes receiving a handover message from a network along with a target cell for the handover. The method includes scanning for primary target cells, upon a failure in detecting the target cell by the User Equipment. The method includes storing the detected primary target cells in a measurement database by the UE. The UE initiates scanning on the stored primary target cells in the measurement database for performing the cell selection during the handover. Further, the UE after the performing the cell selection, sends the re-establishment request message along with the measurement database to the network.

16 Claims, 6 Drawing Sheets

METHOD AND SYSTEM OF CELL SELECTION FOR A HANDOVER DURING COEXISTENCE OF LTE FDD/TDD NETWORKS

PRIORITY

This application claims the benefit under 35 U.S.C. §119(a) of an Indian Provisional Application filed on Oct. 18, 2013 in the Indian Intellectual Property Office and assigned Serial No. 4707/CHE/2013 and an Indian Complete Application filed on Aug. 5, 2014 in the Indian Intellectual Property Office and assigned Serial No. 4707/CHE/2013, the disclosures of which are incorporated herein by reference.

BACKGROUND

1. Field of the Invention

The present invention relates to wireless communication networks and more particularly relates to a method for performing a cell selection in case of a handover from a TDD cell to a FDD cell or vice-versa during coexistence of LTE TDD/FDD networks.

2. Description of the Related Art

Wireless communication networks are widely deployed to provide various communication services such as telephony, video, data, messaging, broadcasts, and so on. Such networks, which are usually multiple access networks, support communications for multiple users by sharing the available network resources. With the increase in the number of wireless technology subscribers, there is a dearth in the available network resources that can be allocated to a subscriber. This has led to the introduction of a many new techniques as well and methods for allocating more users or providing more resources to each subscriber, including the use of increased bandwidth or additional bands. At the same time, mobile communication systems such as 3rd Generation systems (3G) and 4th Generation (4G) also known as (Long Term Evolution (LTE) systems provide enhanced technologies. These 3G and 4G systems enable higher spectral efficiencies and allow for higher data rates and cell capacities. The demands are growing in both directions of transmission, i.e. for the Downlink (DL), i.e. for transmission from the network infrastructure to a mobile transceiver, as well as in the Uplink (UL), i.e. in the direction from the mobile transceiver to the network infrastructure.

In most of the conventional mobile access networks two operation modes are used such as Frequency Division Duplex (FDD) and Time Division Duplex (TDD). FDD uses a paired spectrum with one spectral region or bandwidth for the UL transmission and another spectral region or bandwidth for the DL transmission. TDD uses one piece of spectrum, one spectral region or bandwidth for UL transmission and DL transmission. The availability of spectrum is one of the most important criteria for choosing the mode to be used.

Interworking between FDD/TDD cells in LTE networks will be of increasing importance for operators that have spectrum for both LTE modes. It will allow operators to seamlessly offer mobile broadband services on FDD spectrum and TDD spectrum, increasing capacity and improving consumer experience. Many operators with FDD-LTE networks also own spectrum suitable for TDD-LTE services.

As multimode devices supporting both FDD and TDDLTE become more common, network operators can take full advantage of their spectrum allocations and deploy TDD-LTE as an integral part of their overall mobile broadband service. Apart from these, many operators around the globe are preparing for joint deployment of TDD and FDD based systems where TDD based systems can provide the freedom to configure variable number of resources for downlink and uplink transmissions. However, having smooth interworking between the two modes poses a challenge.

In the existing method, where TDD and FDD cells are jointly deployed, when a User Equipment (UE) moves across the TDD cells and FDD cells (in connected mode) within a given area served by a Base Station (eNodeB or eNB), handover is performed by the UE. When the UE is camped on the FDD cell and network (eNB) sends a handover command to the UE for performing handover to the TDD cell with Evolved Absolute Radio Frequency Channel Number (EARFCN) and target cell ID (TDD cell ID). Then UE starts a T304 timer and lower layers start synchronizing to the DL transmission of the target cell (TDD cell). Further, the UE tries for the target cell (TDD cell) till the expiration of the T304 timer. Upon the expiration of the T304 timer, the UE starts a Radio Resource Control (RRC) connection re-establishment procedure and further starts a T311 timer for performing cell selection.

Further, the UE performs a band scan of either TDD cell or FDD cell based on implementation and on expiry of the timer T311. The UE moves to an idle mode and starts performing cell selection on last camped cell (can be either FDD or TDD cell).

In the existing system, the UE performs blind scan of either TDD or FDD band, which may not be efficient in real time scenarios, where the UE may be in FDD/TDD only area. In certain scenarios, it may also happen that when the UE sends a measurement report to the eNB. During the time the UE receives the handover message, and then the UE may move to some other area where the corresponding mode (either FDD or TDD mode) cells are unavailable. In certain situations, may be due to network error or sub-optimal cell deployments, the network may send a wrong cell id (non-existent or very weak) to the UE for performing the handover from TDD cell to the FDD cell or vice-versa. In case, if the network sends the wrong cell id, the UE performs the scan on the cell id (received from the network), which may lead to a wastage in battery power consumption of the UE.

SUMMARY

The principal object of the embodiments herein is to provide a method and system for performing a cell selection during a handover from a TDD cell to a FDD cell.

Another principal object of the embodiments herein is to provide a method and system for performing a cell selection during a handover from a FDD cell to a TDD cell.

Another object of the invention is to provide a method for seamless and faster resumption of services during co-existence of LTE FDD/TDD networks.

Another object of the invention is to provide a method for maintaining a measurement database for storing the detected TDD/FDD cells in case of a handover during co-existence of LTE FDD/TDD networks.

Accordingly the invention provides a method for performing a cell selection in case of a handover from an initial cell to a target cell by a User Equipment (UE), wherein the initial cell and the target cell is one of a Time Division Duplex (TDD) cell and a Frequency Division Duplex (FDD) cell in a wireless network, the method comprising scanning a target cell on a target frequency indicated by the wireless network for a predefined time interval of a primary timer. Further, the method comprises detecting at least one the target cell on the target frequency. The method further comprises detecting at least one primary target cell on a suitable frequency after expiry of predefined time interval of a primary timer, upon a failure in detecting at least one the target cell. Further, the method comprises storing at least one detected primary target cell based on a priority in a measurement database. Further, the method comprises selecting a primary target cell from at least one stored primary target cell in the measurement database by initiating a secondary timer after expiration of the primary timer, when the primary target cell is available in the measurement database.

Accordingly the invention provides a base station for obtaining information of at least one detected primary target cell from a User Equipment (UE), wherein the base station is configured to obtain a re-establishment request message along with a measurement database from the UE, wherein the measurement database comprises at least one detected primary target cell on a suitable frequency.

Accordingly the invention provides a User Equipment (UE) for performing a cell selection in case of a handover from an initial cell to a target cell, wherein the initial cell and the target cell is one of a Time Division Duplex (TDD) cell and a Frequency Division Duplex (FDD) cell in a wireless network and the UE comprises an integrated circuit. Further the integrated circuit comprises at least one processor and at least one memory. The memory comprises a computer program code within the integrated circuit. At least one memory and the computer program code with the at least one processor cause the UE to scan a target cell on a target frequency indicated by the wireless network for a predefined time interval of a primary timer. Further, the UE is configured to detect at least one target cell on the target frequency. The UE is further configured to detect at least one primary target cell on a suitable frequency after expiry of predefined time interval of a primary timer, upon a failure in detecting at least one the target cell. Further, the UE is configured to store at least one detected primary target cell based on a priority in a measurement database. Further, the UE is configured to select a primary target cell from at least one stored primary target cell in the measurement database by initiating a secondary timer after expiration of the primary timer, when the primary target cell is available in the measurement database.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

Throughout the drawings, like reference numerals will be understood to refer to like parts, components, and structures.

DETAILED DESCRIPTION OF EMBODIMENTS OF THE PRESENT INVENTION

Figure 1:
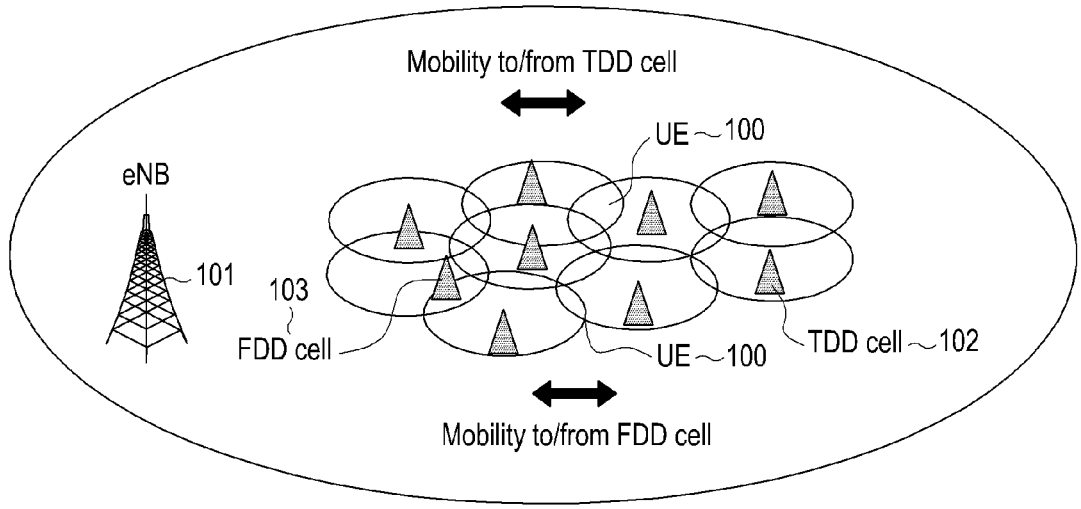
FIG. 1 illustrates an overview of a User Equipment (UE) performing a cell selection during a handover during co-existence of LTE FDD/TDD networks, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method for performing a cell selection in case of a handover from an initial cell to a target cell by a User Equipment (UE). The initial cell and the target cell described herein may refer to either one of a TDD cell or a FDD cell. The method of performing a cell selection during the handover includes scanning a target cell on a target frequency indicated by a wireless network for a predefined time interval of a primary timer. The UE scans for primary target cells when the target cell indicated by the network is unavailable. The primary target cell as described throughout the description refers to either the FDD cell or the TDD cell, in which the UE performs the scanning on these cells (primary target cells) when the target cell is unavailable. In an embodiment, the UE scans for the primary target cells by initiating a primary timer (T304) and stores the detected primary target cells in a measurement database by assigning a priority to the detected primary target cells while the primary timer (T304) is running. When the primary timer is expired, the UE performs a scan on the measurement database for selecting a TDD cell or a FDD cell which are stored in the measurement database by initiating a secondary timer (T311).

In an embodiment, the UE sends a re-establishment request message along with the measurement database to the wireless network after performing the cell selection (either TDD cell or a FDD cell).

In an embodiment, the UE scans for secondary target cells when the UE fails to detect the primary target cells in the measurement database for the cell selection during the handover from the initial cell to the target cell. The secondary target cell as mentioned throughout the description refers to either one of the TDD cell or the FDD cell. The UE performs the scanning on these secondary target cells upon determining that the primary target cells in the measurement database are unavailable Further, the UE sends the re-establishment request message along with the selected secondary cell to the wireless network when the secondary timer (T311) is running.

In an embodiment, the UE sends a re-establishment request message with an empty measurement database to the wireless network, when the UE fails to detect the secondary target cells during the time interval of the secondary timer T311.

Unlike the conventional system, the disclosed method enhances the performance of the UE in an environment by providing a seamless and faster resumption of services during co-existence of LTE FDD/TDD networks. The UE performs a faster handover and thus the services are resumed on the newly camped TDD cell or the FDD cell after the handover procedure.

Throughout the description, the term primary timer refers to T304 timer and the secondary timer refers to T311 timer. The timers T304 and the T311 can have the same functionality as defined in the 3GPP specification for handling the handover from the TDD cell to the FDD cell or vice-versa.

Referring now to the drawings and more particularly to FIGS. 1 through 8 where similar reference characters denote corresponding features consistently throughout the figures, there are shown preferred embodiments.

FIG. 1 illustrates an overview of UE performing a cell selection during a handover during co-existence of LTE FDD/TDD networks, according to embodiments as disclosed herein. The environment in which a base station eNB 101 and the coexistence of LTE TDD/FDD cells is shown in the FIG. 1, initially, the LTE base station or the Evolved Node Base station (eNB 101) sends a handover message with a target cell (either TDD cell 102 or the FDD cell 103) to the UE 100. The UE 100 receives the handover message from the eNB 101 and initiates a scan on the target cell (which can be either TDD cell 102 or the FDD cell 103 as indicated by the eNB 101) for a predefined time interval by running a primary timer (T304). When the UE 100 identifies the target cell within the predefined time interval, then the UE 100 performs the handover to the target cell and continues to obtain the services on the target cell (as indicated by the eNB 101 in the handover message). The base station described herein can be either a LTE base station eNB 101 (as shown in the figure) or a Universal Mobile Telecommunication System (UMTS) base station.

If the UE 100 fails to detect the target cell, as indicated by the eNB 101, the UE performs a scan for primary target cells (which can be either TDD cells or FDD cells) on a suitable frequency or band for the remaining time interval of the primary timer.

The above described scenario is explained herein with an example, In an example, if the configured primary timer (T304) is 10 seconds, then the UE is allowed to scan the target cell for first 7 seconds. If the UE can detect the target cell within 7 seconds, then the UE performs the handover to the target cell. In case, if the UE 100 fails to identify the target cell within 7 seconds, then the UE 100 is allowed to scan for the primary target cells on any suitable frequency or band for the remaining time interval (which is 3 seconds) of the primary timer (T304).

If the UE 100 detects the primary target cells on any suitable frequency, then the UE 100 stores the detected primary target cells (either TDD cells or FDD cells) in a measurement database, based on priority during the time interval of the primary timer (T304).

When the primary timer (T304) is expired, the UE 100 starts scanning the stored primary target cells in the measurement database by initiating a secondary timer (T304). The UE selects a primary target cell for the cell selection when the primary target cell is available after performing the scan during the time interval of the secondary timer (T311). Further, the UE after performing the cell selection (the UE either selects the TDD cell or the FDD cell as in the measurement database) sends a re-establishment request message along with the measurement database (which includes the detected primary target cells).

In an embodiment, if the UE 100 fails to detect the primary target cells that are stored in the measurement database, then the UE 100 is allowed to scan for the secondary target cells on any suitable frequency till the secondary timer (T311) is expired. The UE 100 selects a secondary target cell when the secondary target cell (either TDD cell or the FDD cell is available after performing the scan during the time interval of the secondary timer (T311).

Further, the UE 100 sends a re-establishment request message along with the selected secondary target cell to the eNB 101.

Figure 2:
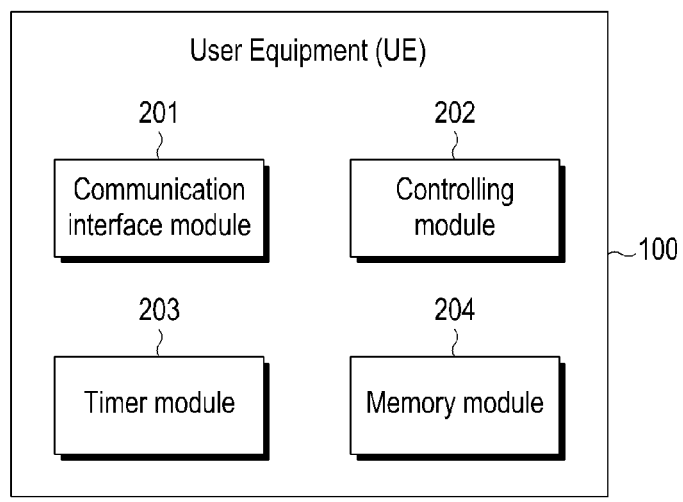
FIG. 2 illustrates a block diagram of the UE with various modules, according to the embodiments as disclosed herein.

FIG. 2 illustrates a block diagram of a User Equipment (UE) 100 with various modules, according to the embodiments as disclosed herein. As depicted in the FIG. 2, the UE 100 comprises a communication interface module 201, a controlling module 202, a timer module 203 and a memory module 204. The communication interface module 201 helps the UE 100 to connect to the wireless network. The controlling module 202 allows the UE 100 to scan on the target frequency received from the base station in a handover message. Further, the controlling module 202 allows the UE 100 to scan for other frequency when a target cell (as indicated by the network in the handover command) is unavailable.

The timer module 203 is configured to calculate the elapsed time for performing the cell selection by the UE 100. In an embodiment, the timer module 203 includes a T304 timer and a T311 timer.

The memory module 204 may include a random access memory (RAM) or another type of dynamic storage device that may store information and instructions, for example an application, for execution by processor, a read-only memory (ROM) device or another type of static storage device.

Figure 3:
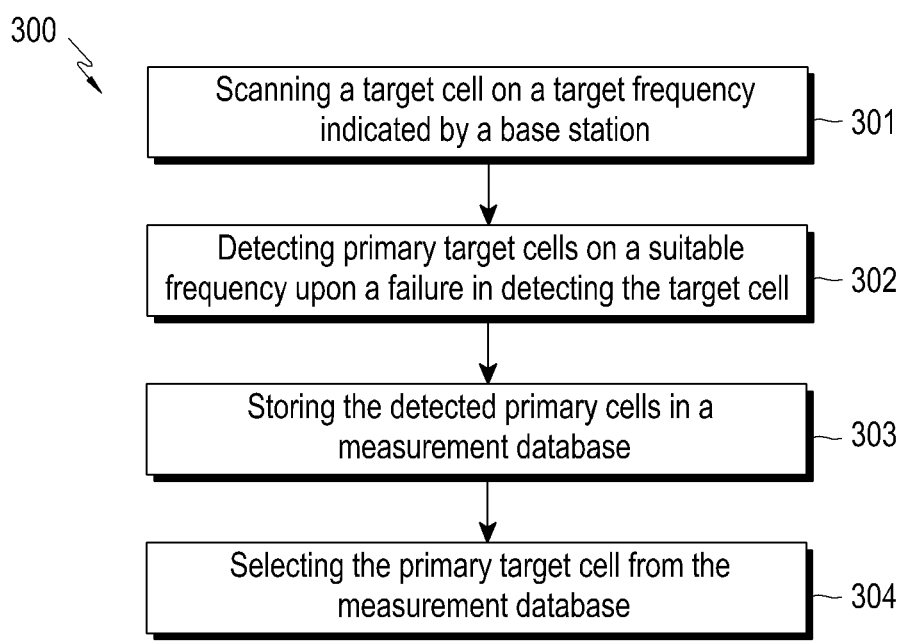
FIG. 3 illustrates a flow diagram explaining a method for performing a cell selection by the UE in case of a handover during co-existence of LTE FDD/TDD networks, according to the embodiments as disclosed herein.

FIG. 3 illustrates a flow diagram explaining a method 300 for performing a cell selection by the UE 100 in case of a handover during co-existence of LTE FDD/TDD networks, according to the embodiments as disclosed herein. At step 301, the method 300 includes scanning a target cell on a target frequency indicated by the base station. In an embodiment, the method 300 allows the controlling module 202 to scan the target cell on the target frequency as indicated by the base station.

In an embodiment, the controlling module 202 allows the UE to scan the target cell on the target frequency for a predefined time interval of a primary timer. In an example, when the primary timer configured by the network is 10 seconds. The controlling module 202 allows the UE 100 to scan for the target cell (on the target frequency) for 7 seconds. If the UE 100 detects the target cell indicated by the network during the scan of 7 seconds, then the UE 100 performs the handover to the detected target cell.

If the UE 100 fails to detect the target cell after scanning for 7 seconds, then the controlling module 202 allows the UE 100 to scan for primary target cells on a suitable frequency for remaining time interval of the primary timer (which is 3 seconds). When the UE 100 fails to detect the target cell after performing the scan (for 7 seconds), then at step 302, the method 300 includes detecting primary target cells on a suitable frequency or any supported band by the UE 100. The controlling module 202 allows the UE 100 to scan for primary target cells till the expiry of the primary timer (i.e., 3 seconds as in the above described example).

At step 303, the method 300 includes storing the detected primary target cells in a measurement database. In an embodiment, the measurement database may be present within the memory module 204 within the UE 100.

At step 304, the method 300 includes selecting a primary target cells from a plurality of primary target cells stored in the measurement database by the UE 100 for performing the cell selection. In an embodiment, the controlling module 202 in the UE 100 initiates the timer T311 for scanning the primary target cells stored in the measurement database for performing the cell selection during the handover.

Further, the various actions, units, steps, blocks, or acts described in the method 300 can be performed in the order presented, in a different order, simultaneously, or a combination thereof. Furthermore, in some embodiments, some of the actions, units, steps, blocks, or acts listed in the FIG. 3 may be omitted.

Figure 4:
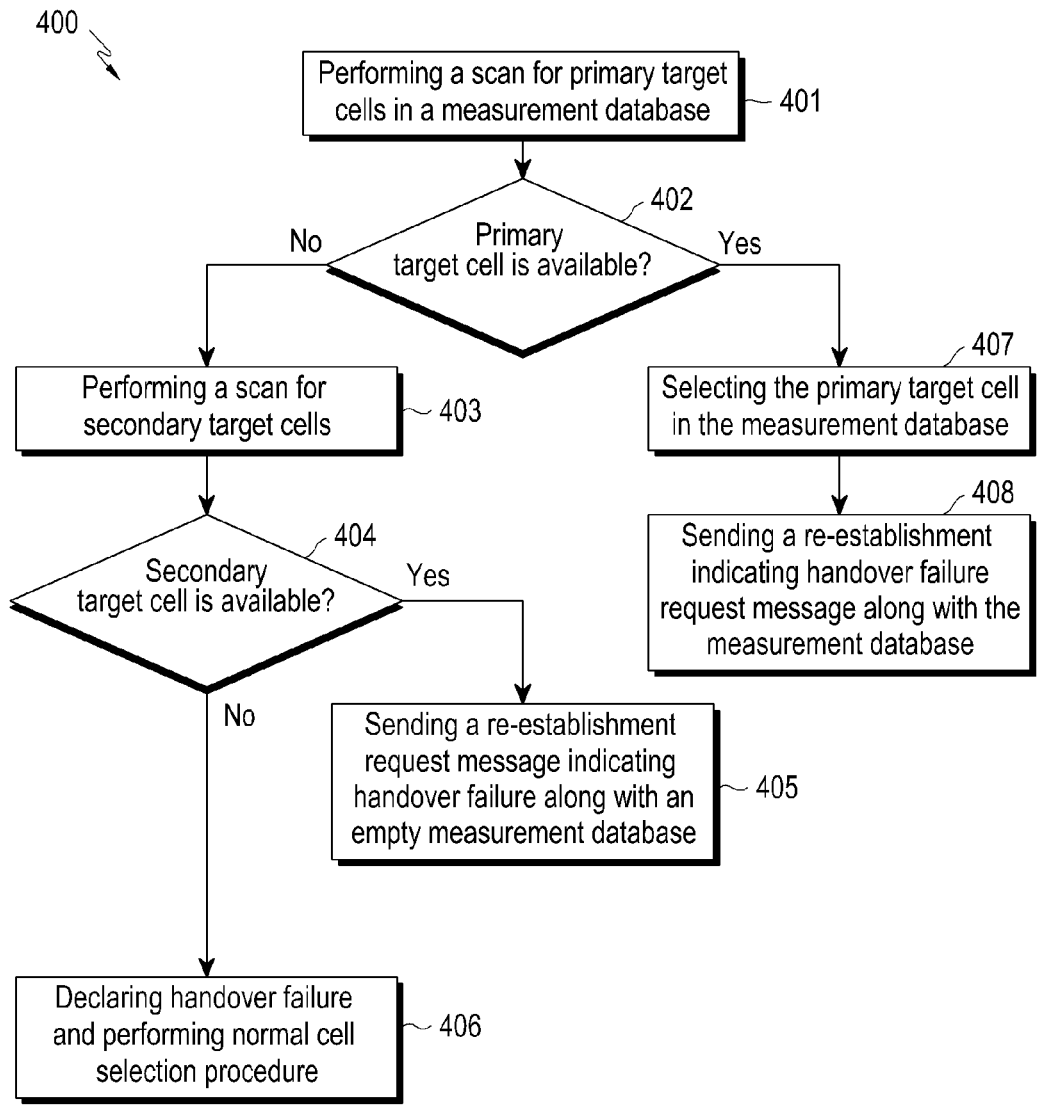
FIG. 4 illustrates a flow diagram explaining a method for performing a cell selection when a primary target cell is unavailable during the handover, according to the embodiments as disclosed herein.

FIG. 4 illustrates a flow diagram explaining a method 400 for performing a cell selection when a primary target cell is unavailable for the UE during the handover, according to the embodiments as disclosed herein. In an embodiment, at step 401, the method 400 includes performing a scan for primary target cells. If any primary cells are detected, the detected primary cells are added into the measurement database. In an embodiment, the controlling module allows the UE 100 to scan for the primary target cells on expiry of a predefined time interval of the primary timer (T304). At step 402, the method 400 includes determining whether a primary target cell is available within the measurement database by the UE 100 when the primary timer T304 expires. If at step 402, it is determined that the primary target cell is available, then at step 407, the method includes selecting the primary target cell for cell selection by the UE 100 during the handover failure recovery procedure. In an embodiment, the controlling module 202 allows the UE 100 to scan the measurement database in a sequential manner based on the order of storage of the detected primary target cells within the measurement database.

When the UE 100 selects the primary target cell after performing the scan on the measurement database, at step 408, the method 400 includes sending a reestablishment request message indicating handover failure along with the measurement database. The communication interface module 201 allows the UE 100 to send the reestablishment request message along with the measurement database to the network so that network can use this information (in the measurement database) to trigger the next handover. Thus obtaining the measurement database (from the UE during the handover failure recovery procedure) can help the network operators for better Handover (HO) thresholds setting and reduce the HO failure.

In an embodiment, the above described method for performing the cell selection can also be applicable, if the UE 100 detected Out-of-State (OOS) in an idle mode. Instead of performing blind scan (as described in the existing system), the UE 100 can first start scan based on the available cells (either TDD cells or the FDD cells) in measurement database followed by blind scan if no suitable cell is found after the scan of the measurement database. Thus the above procedure for cell selection during the handover will help in faster resumption of services in idle mode.

If it is determined at step 402, that the primary target cell is unavailable after performing a scan on the measurement database by the UE 100, at step 403, the method includes performing a scan on secondary target cells by the UE 100. In an embodiment, the controlling module allows the UE 100 to scan for the secondary target cells when the secondary timer (T311) is running. At step 404, the method 400 includes determining whether the secondary target cells are available for performing the cell selection by the UE 100. If it is determined at step 404, that the UE has detected a secondary target cell by performing the scan for the secondary target cells, then at step 405, the method 400 includes sending the reestablishment request message indicating handover failure along with an empty measurement database to the network. The empty measurement database contains no cells (in the scenario, where the UE is unable to identify the secondary target cells during the time interval of the secondary timer). In an embodiment, the communication interface module 201 allows the UE 100 to send the reestablishment request message along with the empty measurement database to the network.

If, it is determined at step 404, that the secondary target cells are unavailable after performing the scan for secondary target cells by the UE 100, then at step 406, the method 400 includes declaring a handover recovery failure and performing a normal cell selection procedure by the UE 100. Further, the various actions, units, steps, blocks, or acts described in the method 400 can be performed in the order presented, in a different order, simultaneously, or a combination thereof. Furthermore, in some embodiments, some of the actions, units, steps, blocks, or acts listed in the FIG. 4 may be omitted.

Figure 5:
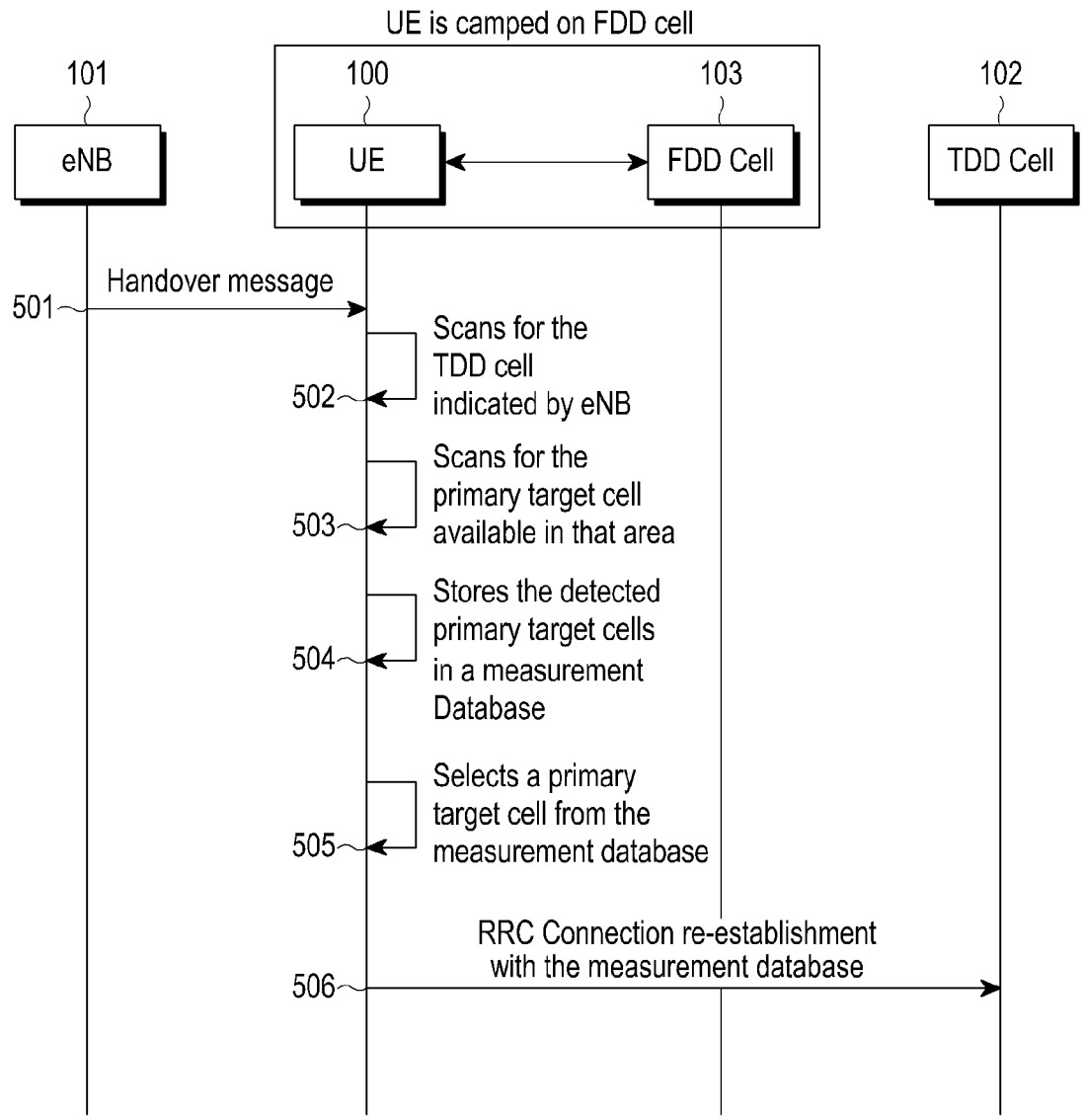
FIG. 5 is an example sequence diagram in which the UE performs a cell selection during the handover from the TDD cell to the FDD cell, according to the embodiments as disclosed herein.

FIG. 5 is an example sequence diagram in which the UE performs a cell selection during the handover from the TDD cell to the FDD cell, according to the embodiments as disclosed herein. In the sequence diagram shown in the FIG. 5, the UE 100 is camped on the FDD cell 103. The UE 100 receives (501) a handover message from the eNB 101. In an embodiment, the eNB 101 provides, for example a TDD cell to the UE 100 in the handover message. The UE 100 scans (502) for the TDD cell (target cell) by for a predefined time interval by initiating the primary timer (T304).

If the TDD cell (provided by the eNB) is not detected by the UE 100 for the predefined time interval, the UE 100 scans (503) for the primary target cells (available in that area) for the remaining time interval of the primary timer (T304). Further, the UE 100 stores (504) the detected primary target cells in the measurement database for the remaining time interval of the primary timer.

When the primary timer (T304) is expired, the UE 100 selects (505) a primary target cell from the measurement database by initiating the secondary timer (T311). In an embodiment, the UE 100 scans for the primary cells stored in the measurement database based on the order of the storage of the primary cells within the measurement database. If the UE 100 detects a primary cell (for example, a TDD cell 102 as shown in the FIG. 5) from the measurement database, then the UE 100 sends (506). The re-establishment request message with the measurement database (TDD cell 102, in the above example) to the eNB 101 as shown in FIG. 5.

The above described steps can also be applicable for performing the cell selection during the handover from the FDD cell to the TDD cell, FDD cell to FDD cell and TDD cell to the TDD cell.

Figure 6:
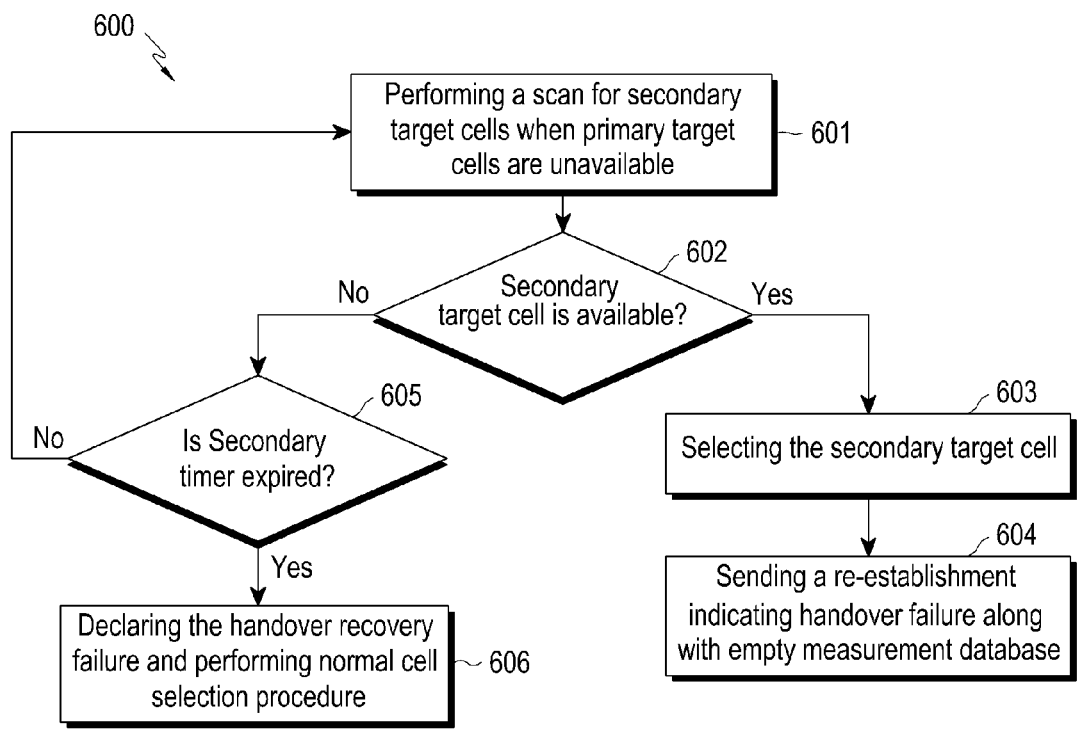
FIG. 6 illustrates a flow diagram explaining the method for performing the cell selection when a secondary target cell is unavailable during the handover, according to the embodiments as disclosed herein.

FIG. 6 illustrates a flow diagram explaining the method 600 for performing the cell selection when a secondary target cell is unavailable during the handover, according to the embodiments as disclosed herein. At step 601, the method 600 includes performing a scan on secondary target cells by the UE 100 when the primary target cells stored in the measurement database are unavailable. In an embodiment, the controlling module allows the UE 100 to scan for the secondary target cells when the secondary timer (T311) is running. In an example, the UE 100 performs scanning on the secondary target cells (either FDD or TDD cells), when the timer T311 is running. If the duration of the secondary timer, for example is 7 seconds, then the controlling module 202 allows the UE 100 to scan for the secondary target cells (either TDD cells or FDD cells) for 7 seconds. At step 602, the method 600 includes determining whether the secondary cells are available for performing the cell selection by the UE 100.

If, it is determined at step 602 that the UE 100 detects a secondary target cell by performing the scan for the secondary target cells (for 7 seconds as in the above example), then at step 603, the method 600 includes selecting the detected secondary target cell (which can be either TDD cell or the FDD cell). At step 604, the method 600 includes sending a reestablishment request message indicating handover failure along with the measurement database to the wireless network.

If it is determined at step 602, that the secondary target cell is unavailable after performing the scan for the secondary target cells by the UE 100 when the secondary timer is running, then at step 605, the method 600 includes determining whether the secondary timer has expired (the 7 seconds of the secondary timer is completed). If it is determined at step 605, that the secondary timer has expired and the secondary target cell is unavailable for the UE 100 to perform the handover failure recovery, then at step 606, the method 600 includes declaring a handover recovery failure and performing the normal cell selection procedure by the UE 100. If it is determined at step 604, that the secondary timer has not expired, then the method 600 perform step 601.

Further, the various actions, units, steps, blocks, or acts described in the method 600 can be performed in the order presented, in a different order, simultaneously, or a combination thereof. Furthermore, in some embodiments, some of the actions, units, steps, blocks, or acts listed in the FIG. 6 may be omitted.

Figure 7:
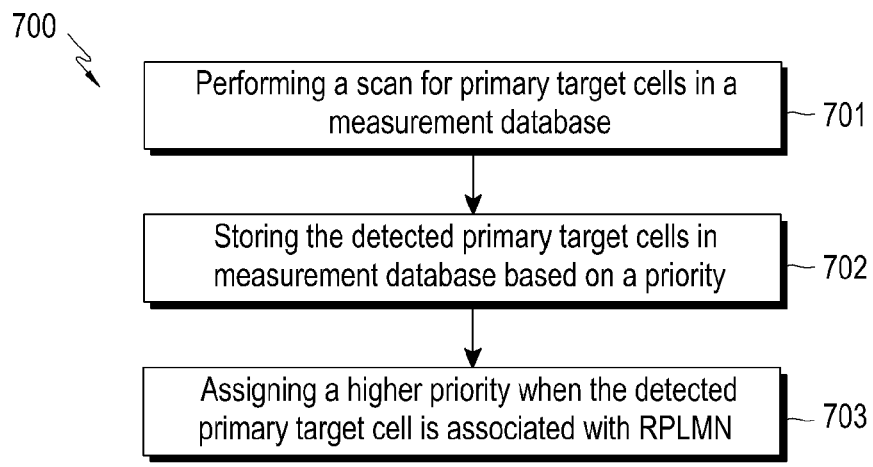
FIG. 7 illustrates a flow diagram explaining a method for storing the cells in a measurement database by the UE, according to the embodiments as disclosed herein.

FIG. 7 illustrates a flow diagram explaining a method 700 for storing the cells in a measurement database by the UE, according to the embodiments as disclosed herein. The measurement database contains a list of all detected primary target cells and configured cells along with the frequency information, Public Land Mobile Network (PLMN) information, Cell Global Identifier (CGI) information and priority. At step 701, the method 700 includes performing a scan for primary target cells on a suitable frequency by the UE 100 when the primary timer (T304) is running. The controlling module 202 allows the UE 100 to perform the scan for primary target cells on a suitable frequency. In an embodiment, the UE 100 performs the scan for the primary target cells when the target cell (either TDD cell or the FDD cell as indicated by the network) is unavailable. At step 702, the method 700 includes storing the detected primary target cells in the measurement database based on the priority.

In an embodiment, the priority is assigned based on signal strength as measured by the UE 100. If any two entries in the measurement database have same signal strength, then the priority can be assigned based on latest entry in the measurement database. In an embodiment, a new entry may include highest priority as compared to an old entry in the measurement database. In an example, a newly added primary target cell (either TDD cell or a FDD cell) in the measurement database is assigned with the higher priority when compared to an older entry (which can be either TDD cell or the FDD cell) in the measurement database.

At step 703, the method 700 includes assigning a higher priority when the detected primary target cell is associated with a Registered Public Land Mobile Network (RPLMN). In an example, the TDD cell or the FDD cell associated with the RPLMN of the UE 100 is assigned with the higher priority while storing the TDD cell or the FDD cell in the measurement database. In an embodiment, the UE 100 assigns a lower priority to the detected primary target cell (which is TDD cell 102 or the FDD cell 103) when the detected primary target cell is either not associated with the RPLMN or is associated with a different PLMN other than the RPLMN of the UE 100.

Figure 8:
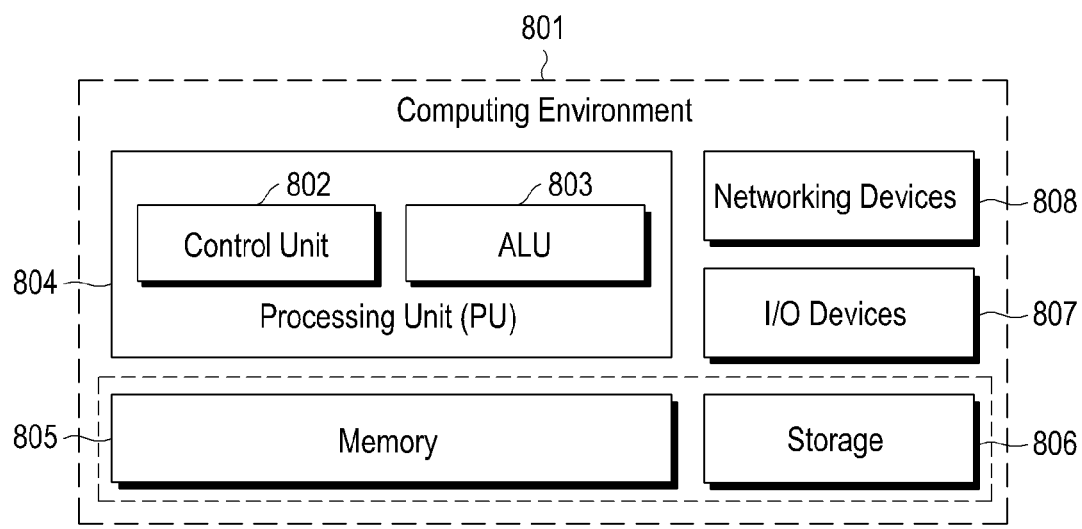
FIG. 8 illustrates a computing environment implementing the method for performing cell selection in case of a handover during co-existence of LTE FDD/TDD networks, according to the embodiments as disclosed herein.

FIG. 8 illustrates a computing environment implementing the method for performing cell selection in case of a handover during co-existence of LTE FDD/TDD networks, according to the embodiments as disclosed herein. As depicted the computing environment 801 comprises at least one processing unit 604 that is equipped with a control unit 802 and an Arithmetic Logic Unit (ALU) 803, a memory 804, a storage unit 806, plurality of networking devices 608 and a plurality Input output (I/O) devices 807. The processing unit 804 is responsible for processing the instructions of the algorithm. The processing unit 804 receives commands from the control unit in order to perform its processing. Further, any logical and arithmetic operations involved in the execution of the instructions are computed with the help of the ALU 803.

The overall computing environment 801 can be composed of multiple homogeneous and/or heterogeneous cores, multiple CPUs of different kinds, special media and other accelerators. The processing unit 804 is responsible for processing the instructions of the algorithm. Further, the plurality of processing units 604 may be located on a single chip or over multiple chips.

The algorithm comprising of instructions and codes required for the implementation are stored in either the memory unit 805 or the storage 806 or both. At the time of execution, the instructions may be fetched from the corresponding memory 805 and/or storage 806, and executed by the processing unit 604.

In case of any hardware implementations various networking devices 808 or external I/O devices 807 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, 5 and 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for performing a cell selection in case of a handover from an initial cell to a target cell by a User Equipment (UE), wherein said initial cell and said target cell is one of a Time Division Duplex (TDD) cell and a Frequency Division Duplex (FDD) cell in a wireless network, said method comprising:
    scanning a target cell on a target frequency indicated by said wireless network for a predefined time interval of a primary timer;
    detecting at least one said target cell on said target frequency;
    detecting at least one primary target cell on a suitable frequency after expiry of predefined time interval of a primary timer, upon a failure in detecting said at least one said target cell;
    storing at least one said detected primary target cell based on a priority in a measurement database; and
    selecting a primary target cell from at least one said stored primary target cell in said measurement database by initiating a secondary timer after expiration of said primary timer, when said primary target cell is available in said measurement database.

2. The method of claim 1, wherein selecting said primary target cell from at least one said stored primary target cell in said measurement database comprises:
    performing a scan on at least one said stored target cell in said measurement database.

3. The method of claim 1, wherein said method further comprises:
    sending a re-establishment request message along with said measurement database to said wireless network, after selecting said primary target cell from at least one said stored primary target cell in said measurement database.

4. The method of claim 1, wherein said method further comprises:
    when said primary target cell is unavailable in said measurement database;
    performing a scan for a secondary target cell other than at least one said stored primary target cell in said measurement database; and
    selecting said secondary target cell when said secondary target cell is detected after performing said scan.

5. The method of claim 4, wherein method further comprises:
    sending a re-establishment request message indicating handover failure along with an empty measurement database said wireless network.

6. The method of claim 4, wherein said method further comprises:
    when said secondary target cell is unavailable after performing said scan and said secondary timer is expired; and
    sending a handover failure message with an empty measurement database to said wireless network.

7. The method of claim 1, wherein storing at least one said detected primary target cell based on said priority in said measurement database comprises:
    measuring a signal strength of at least one said detected primary target cell; and
    assigning said priority to at least one said detected primary target cell based on said measured signal strength.

8. The method of claim 7, wherein assigning said priority to at least one said detected primary target cell based on said measured signal strength comprises:
    when said measured signal strength of said at least one detected primary target cell are equal;
    determining whether at least one said detected primary target cell is associated with a Registered Public Land Mobile Network (RPLMN) of said UE; and
    assigning a higher priority to at least one said detected primary target cell in response to determining that at least one said detected primary target cell is associated with said RPLMN.

9. A User Equipment (UE) for performing a cell selection in case of a handover from an initial cell to a target cell, wherein said initial cell and said target cell is one of a Time Division Duplex (TDD) cell and a Frequency Division Duplex (FDD) cell in a wireless network and said UE comprises:
    an integrated circuit further comprising at least one processor; and
    at least one memory having a computer program code within said circuit,
    wherein said at least one memory and said computer program code with said at least one processor cause said UE to:
        scan a target cell on a target frequency indicated by said wireless network for a predefined time interval of a primary timer,
        detect at least one said target cell on said target frequency,
        detect at least one primary target cell on a suitable frequency after expiry of predefined time interval of a primary timer, upon a failure in detecting said at least one said target cell,
        store at least one said detected primary target cell based on a priority in a measurement database, and
        select a primary target cell from at least one said stored primary target cell in said measurement database by initiating a secondary timer after expiration of said primary timer, when said primary target cell is available in said measurement database.

10. The UE of claim 9, wherein said UE is configured to perform a scan on at least one said stored target cell in said measurement database for selecting a primary target cell from at least one said stored primary target cell in said measurement database.

11. The UE of claim 9, wherein said UE is further configured to send a re-establishment request message along with said measurement database to said wireless network, after selecting said primary target cell from at least one said stored primary target cell in said measurement database.

12. The UE of claim 9, wherein said UE is further configured to:
   determine said primary target cell is unavailable in said measurement database;
   perform a scan for a secondary target cell other than at least one said stored primary target cell in said measurement database; and
   select said secondary target cell when said secondary target cell is detected after performing said scan.

13. The UE of claim 12, wherein said UE is further configured to send a re-establishment request message indicating handover failure along with an empty measurement database said wireless network.

14. The UE of claim 12, wherein said UE is further configured to:
   send a handover failure message with an empty measurement database to said wireless network when said secondary target cell is unavailable after performing said scan and said secondary timer is expired.

15. The UE of claim 9, wherein said UE is configured to:
   measure a signal strength of at least one said detected primary target cell; and
   assign said priority to at least one said detected primary target cell based on said measured signal strength before storing at least one said detected primary target cell based on said priority in said measurement database.

16. The UE of claim 15, wherein said UE is configured to:
   assign a higher priority to at least one said detected primary target cell upon determining that at least one said detected primary target cell is associated with a Registered Public Land Mobile Network (RPLMN) of said UE, when said measured signal strength of said at least one detected primary target cell are equal.

\* \* \* \* \*